United States Patent
Kessler et al.

(10) Patent No.: US 6,941,556 B1
(45) Date of Patent: Sep. 6, 2005

(54) METHOD AND SYSTEM FOR TYPE IDENTIFICATION FOR MULTIPLE OBJECT INTERFACES IN A DISTRIBUTED OBJECT ENVIRONMENT

(75) Inventors: Peter B. Kessler, Palo Alto, CA (US); Swee Boon Lim, Mountain View, CA (US); Peter Vanderbilt, Mountain View, CA (US); Michael L. Powell, Palo Alto, CA (US); Li-Wen Chen, Cupertino, CA (US); Dwight F. Hare, La Selva Beach, CA (US); Alan Snyder, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/317,714

(22) Filed: May 24, 1999

Related U.S. Application Data (62) Division of application No. 08/708,945, filed on Sep. 6, 1996, now abandoned, which is a division of application No. 08/410,357, filed on Mar. 24, 1995, now abandoned.

(51) Int. Cl.[7] .............................................. G06F 9/00
(52) U.S. Cl. ..................................................... 719/316
(58) Field of Search .............................. 709/315, 316, 709/203; 707/103 R (56) References Cited

U.S. PATENT DOCUMENTS

| | | | | |
|---|---|---|---|---|
| 5,377,323 A | * | 12/1994 | Vasudevan | 709/226 |
| 5,568,639 A | * | 10/1996 | Wilcox et al. | 707/200 |
| 5,577,252 A | * | 11/1996 | Nelson et al. | 709/100 |
| 5,581,761 A | * | 12/1996 | Radia et al. | 717/108 |
| 5,701,462 A | * | 12/1997 | Whitney et al. | 707/10 |
| 5,724,503 A | * | 3/1998 | Kleinman et al. | 719/318 |
| 5,745,683 A | * | 4/1998 | Lee et al. | 709/250 |
| 6,505,210 B1 | * | 1/2003 | Frey et al. | 707/103 R |

OTHER PUBLICATIONS

G. Neufeld, "Descriptive Names in X.500", ACM, 1989, pp. 64–71.*
OMG RFP Submission: Interface Repository, Version 1.0, Nov., 1994, pp. (64).*
S. Radia, et al, The Spring Name Service, Sun Microsystems Laboratories, Inc., Nov. 1993, pp. (27).*
SOMobjects Developer Toolkit Users Guide, version 2.0, Jun. 1993, pp. 7–1 to 7–15.*

* cited by examiner

*Primary Examiner*—Sue Lao
(74) *Attorney, Agent, or Firm*—Robert C. Kowert; Meyertons, Hood, Kivlin, Kowert & Goetzel, P.C.

(57) ABSTRACT

A system and method provides dynamic and static type support for multiple definitions of individual types in a distributed object environment. Fully scoped object names incorporating prefixes are used to distinguish objects. The fully scoped names are used for both dynamic type determination through an interface repository and for statically compiled types in client and server stub routines. In the interface repository, a prefix naming context is provided for each root interface definition language context, allowing multiple definitions for objects with the same interface definition language object name, where each such definition resides in a separate prefix naming context. In one embodiment, the prefix naming contexts are defined by prefix interface definition objects. In another embodiment, the fully scoped object names are embedded by an interface definition language compiler in stub and skeleton code routines. RRS.

27 Claims, 4 Drawing Sheets

METHOD AND SYSTEM FOR TYPE IDENTIFICATION FOR MULTIPLE OBJECT INTERFACES IN A DISTRIBUTED OBJECT ENVIRONMENT

This application is a divisional of U.S. patent application Ser. No. 08/708,945, filed Sep. 6, 1996, now abandoned, which is a divisional of U.S. patent application Ser. No. 08/410,357, filed Mar. 24, 1995, now abandoned.

BACKGROUND

1. Field of Invention

This invention relates to the field of object oriented application and operating systems development, and more particularly, to methods and systems supporting the evolution of object interfaces in a distributed object programming environment.

2. Background of Invention

Client-server computing is the predominant model for the management of computing resources, typically on a network of distributed computers. Servers are computers and application programs executing thereon that provide various functional operations and data upon request. Clients are computers and applications that request such services. While clients and servers may be distributed in various computers on a network, they may also reside in a single computer, with individual applications providing client or server functions, or both.

In a client-server system based on a object oriented development environment, a server implements and manages the functionality of a collection of objects. An object consists of some state, and the interface of an object defines the methods, along with the parameters for the methods, to manipulate the state of the object. A client is code that invokes the methods of an object to manipulate the object.

In a distributed object programming environment, a client invokes an object through an object reference, without having information as to where the invoked object resides in the system, that is, without having specific information about the computer where the invoked object is stored or where it is running. Rather, the client passes the object reference through an object request broker (ORB) that locates the server, and passes back any output from the server to the client. To the user, the client and server, and any group of distributed objects, behave transparently as an integrated application, even though the objects may be distributed in various computer systems. One standard for a distributed object programming environment is the Common Object Request Broker Architecture (CORBA), specified by the Object Management Group (OMG).

In the CORBA environment, for the ORB to correctly handle requests, it must have access to the interface definitions of each of the objects it handles. The interface definitions can be made available to the ORB in one of two ways. First, the interface definitions can be directly incorporated into stub routines that represent object methods. Stubs implement proxy objects in the client. To invoke a server object, a client invokes a method on the proxy object for the server object. The stub routine of the proxy object communicates with the ORB to transmit a request to the ORB. In this manner, a client can specify to the ORB the desired operation of the server object, since the interface of the server object is coded into the client. This process provides for static type checking of object definitions for clients written in programming languages such as C++. The client cannot access through its stubs, objects whose interfaces were not included in the stubs when the client was created.

Second, the interface definitions can be persistently stored in an interface repository, from which the ORB may dynamically access the interfaces definitions. With an interface repository, a client may invoke objects dynamically, without having information about the objects when the client is defined. When the client makes such an invocation, the client may access the interface repository to obtain the method signature of the invoked method. The client requires the method signature to construct a well-formed request to the object server and to receive the results of the operation. The ORB may also use the method signature to dynamically type check the parameters of the invocation. In the interface repository, the interface definition of an object comprises a description of the operations the object provides, along with the parameters of each operation, the exceptions it may raise, and additional context information. Each interface definition is itself stored as an interface definition object having operations that manipulate the underlying interface information. For example, an interface definition object for the interface of a given server object will return to a client a description of the interface in response to a request.

As stated above, a client invokes an object by first obtaining an object reference. The client can invoke on the object reference a method to obtain another object reference to the interface definition object in the interface repository that handles the interface definition of the desired object. When the client has the interface of the object, it may invoke any of the methods or attributes defined in the interface.

Under the existing CORBA specification (OMG Object Request Broker 2.0 Interface Repository RFP, OMG TC Document 94-11-7, available by anonymous ftp from omg.org), an interface repository must be coherent, meaning, in part, there is only one interface definition object in the interface repository for each type of object. As stated above, each object has an interface; the interface is described by a declaration in an interface definition language file, such as in the IDL defined by the OMG in TC Document 93-12-43. Each interface declaration has a scoped name. Two objects are of the same type if their interface declarations have the same scoped name. This is required to ensure the interface definition objects, which have the name given in the interface declarations, can be uniquely resolved. As the resolutions are based on type names, if there are two interface definition objects associated with a given type of object, name collision will result.

While this architecture ensures correct identification of objects with stable interfaces, it hinders the more realistic model of system development where object interfaces evolve over time. The evolution of object interfaces is a normal aspect of most systems, and thus it is desirable for the interface repository to support interface evolution.

For example, in a desirable system installation there may be two co-existing environments, a deployment environment, and a development environment. In the deployment environment, objects and their interfaces are stable and unchanging. This is necessary to ensure that the behavior of each object is consistent, thoroughly tested, and known to all clients. In the development environment, however, the object interfaces are continually being improved and updated. These two environments must be kept separate so that client invocations in the deployment environment, where the client expects a particular interface for an object, do not invoke the development version of the object, which may not behave as expected by the client. However, when the development version of the object is stable, it is necessary to place it in the deployment environment for use by all clients.

The problem is that on a single system with a single interface repository, there is currently no easy way to separate the deployment and development environments so that multiple objects of the same type are represented by different interface definition objects. Thus, to differentiate development and development objects, the development objects must be distinct types, from the deployment object, having their own interface definition objects. Otherwise, if the interface of an object is updated, with methods added or deleted, existing clients holding an object reference would malfunction, since these clients would expect the previous interface of the object.

More importantly, in order to install a new object interface, it is most desirable to have both object interfaces for the current deployed and updated development objects operating at the same time, with some clients using the current interface, and some clients running the new interface. This allows a smooth transition between interfaces. However, an interface repository operating merely according to the OMG specifications does not allow multiple interface definition objects for a single object type. When requested to insert a second interface definition object where there already exists a first interface definition object for a given type of object, such an interface repository would either enter the second interface definition object and remove the first, or would reject the request as invalid. If the interface repository did allow the insertion of the second interface definition object, any later client request to resolve an interface by an object name would return an ambiguous result.

In response to this problem the CORBA standard suggests the use of multiple interface repositories to insulate the development environment from the deployment environment. This approach severely limits the ability of the object developers to thoroughly test development objects with existing common resources, or existing client objects in the deployment environment. To test with existing clients, the deployed objects would have to be duplicated in the development environment, resulting in greater requirements for system resources.

In addition, in order to install a new or updated object interface with separate interface repositories for development and deployment, the deployment interface repository must be shutdown, and the new interface installed, replacing the old one. This may impose unacceptable operating burdens on the system, and is not possible in large-scale systems that must run continuously, such as banking systems, or online transaction processing systems.

Accordingly, it is desirable to provide an improved system that allows a single interface repository to maintain multiple interface definition objects for a given object type, while providing correct interface identification and type checking for object requests.

SUMMARY OF THE INVENTION

The present invention overcomes the foregoing limitations by providing fully scoped object names to objects, where the scoped names include a prefix that distinguishes objects in different naming contexts. In one aspect of the invention, a single interface repository includes a number of prefix naming contexts which are the IDL root contexts for different groups of interface definition objects. In each prefix naming context there can be interface definition objects for objects that have the same IDL name as objects in another prefix naming context. Name collision is avoided since each interface definition object has a fully scoped name that includes the name of the prefix naming context, thereby resulting in different object types. In a preferred embodiment of this aspect of the invention, the prefix naming context is defined by a prefix object. In this embodiment, an interface repository loader loads IDL files containing IDL declarations into a specified prefix naming context, creating the prefix naming context if necessary. The interface repository loader further creates a new type of data file, an ifr file, that identifies the prefix naming context for each IDL declaration.

In another aspect of the invention, fully scoped object names are used in client stub and server skeleton code routines that access the object request broker environment. The fully scoped names here allow statically defined object types to be correctly identified and accessed by client objects. In a preferred embodiment of this aspect of the invention, an IDL compiler generates the stub and skeleton code routines.

DETAILED DESCRIPTION OF THE INVENTION

System Architecture

Figure 1:
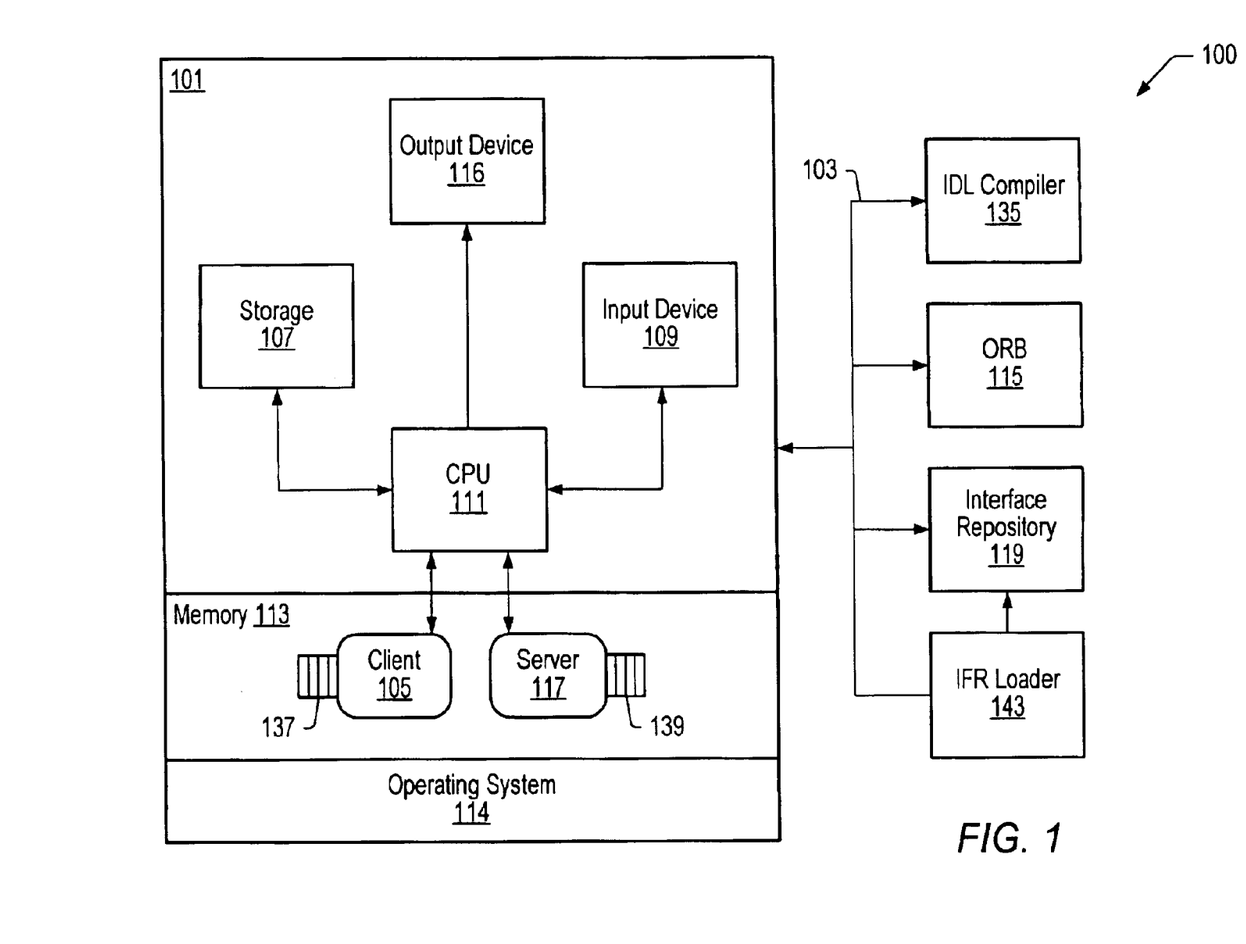
FIG. 1 is a block diagram of a system for providing object type support for multiple interface definitions.

Referring now to FIG. 1, there is shown a system for using the improved interface repository of the present invention. The system 100 includes a host computer 101 having a secondary storage 107 for long term storage of object implementation code and data, including servers and clients, and the like, an input device 109 and an output device 116 for receiving and outputting commands and data into the system 100, and an addressable memory 113 for storing server and client implementation code during execution by a processor 111. During execution by the processor 111, server 117 and client 105 objects exist as processes in the addressable memory 113. Additional server objects 117 and clients 105 may execute as a processes in other host computers 101 (not shown) connected along a network 103, or may execute as separate processes in any one of the host computers 101, or may is execute in the same process. Each client 105 requests services or data from server objects 117 in host computers 101 on the network 103. The host computers 101 may be realized by most general purposes computers, such as a SPARCstation™ computer manufactured by Sun Microsystems, Inc. of Mountain View, Calif. Any other general purpose computer may also be adapted for use with the invention. The host computer 101 executes a general purpose operating system 114, such as Sun Microsystems' Solaris® operating system.

The system 100 incorporates an object request broker environment, satisfying the CORBA standards set by the Object Management Group in *The Common Object Request Broker: Architecture and Specification*, Rev. 1.2, OMG TC Document Number 93-12-43, available by anonymous ftp from omg.org. Other equivalent environments for distributed object systems may also be used. In the preferred embodiment, the object request broker environment is Sun Microsystems' Project DOE (Distributed Objects Everywhere). Accordingly, the system 100 includes an object request broker (ORB) 115, providing the functionality defined in the CORBA specification. Briefly, the ORB 115 handles requests for services from clients 105, determines the appropriate object implementation to service the request, conveys the request to the object implementation, and conveys the response to the request from the object implementation to the client 105. The ORB 115 allows the interface of the servicing object to be completely independent of the location or language of the object implementation. Each client 105 include stub code routines 137 for communicating with the ORB 115. Each server object 117 likewise has skeleton code routines 139 for communicating with the ORB 115.

There is also provided in system 100 an interface repository 119 in accordance with the present invention. The interface repository 119 provides the basic functionality of described in the CORBA specification, along with the further improvements described herein. An interface definition lanaguage compiler 135 is used to compile interface definition lanaguage files into the client stubs 137 and server skeleton 139 code routines for allowing objects to directly access the ORB 115. The interface definition language files may be written in any suitable language, such as IDL as defined by the OMG. For ease of reference, interface definition lanaguages referenced herein will be refered to as "IDL" but this is understood to include any interface definition langauge, and not merely IDL. An interface repository loader, IFR loader 143, takes a specified IDL file and loads the interface declarations contained therein into the interface repository 119. The operation of the IFR loader 143 is further described in the next section.

Figure 2:
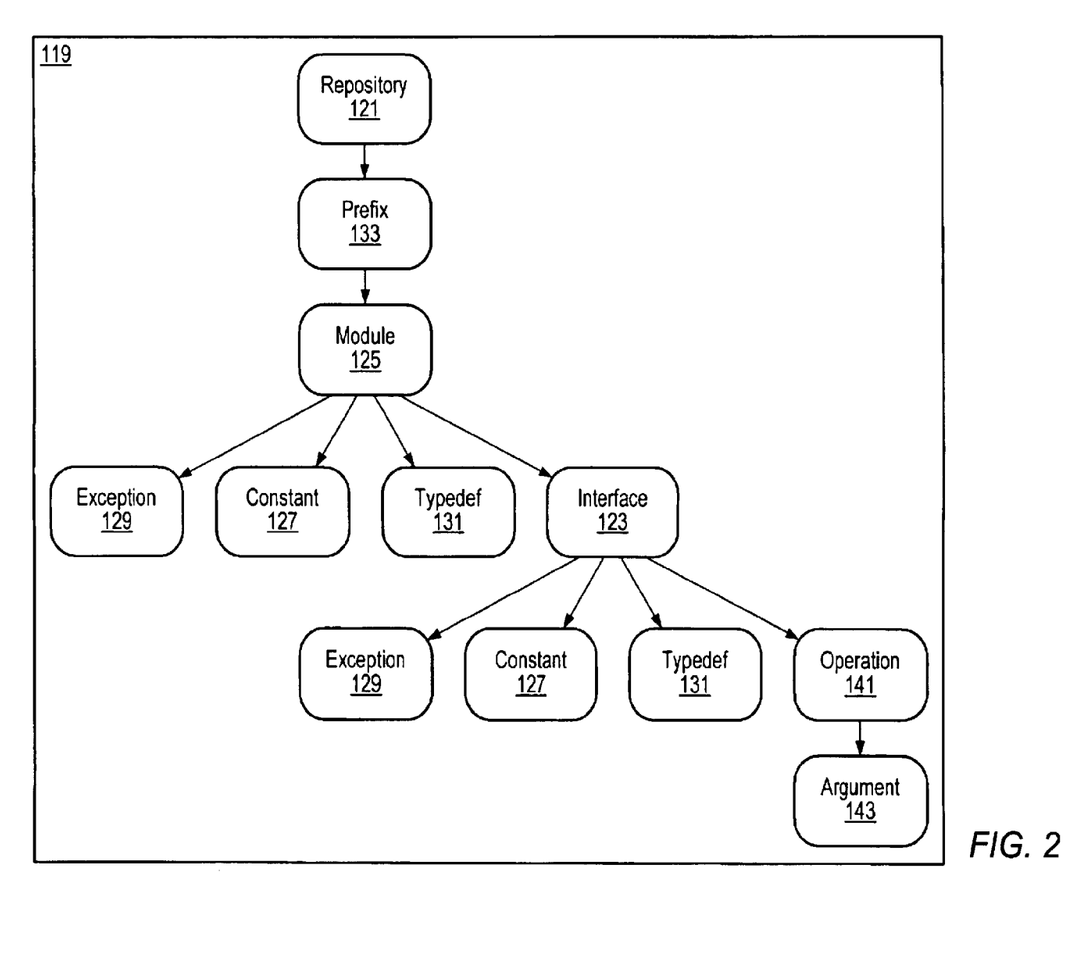
FIG. 2 is an illustration of the interface repository of the present invention.

Referring now to FIG. 2, there is shown in more detail one embodiment of the interface repository 119 of the present invention. In this embodiment, the interface repository 119 includes a number of naming contexts that define a hierarchy of information related to the interfaces of various objects in system 100. In the preferred embodiment, the naming contexts are instantiated with interface definition objects.

More particularly, there is provided a single repository object 121 that provides a number of operations for globally accessing the interface repository 119, including operations that locate a particular interface definition object by either an object name or repository identifier. Other interface definition objects are also provided, including interface objects 123, which define the constants, types, exceptions, operations, and attributes of each object in the system 100. Other interface definition objects are also provided, including module objects 125, exception objects 129, operation objects 141, and argument objects 143, which may be part of a naming context defined by an interface object 123. Each of these objects may act as a container for other interface definition objects, thereby providing a hierarchical arrangement of naming contexts. Non-container interface definition object includes constant objects 127 and typedef objects 131. These interface definition objects are disposed as leaf nodes in the interface repository 119. The interface definition objects in the interface repository 119 are preferably derived from IDL files used to define the object interfaces. Together, the interface definition objects form a hierarchical name space that can be traversed to locate the interface of an object in response to a request by a client object.

To overcome the problems encountered when multiple interface definitions for a given type of object are accessed in a single interface repository, either through the name space of the interface repository 119, or through interface definition objects, the interface repository 119 and the interface definition objects therein have two additional features. First, the interface repository 119 includes at least one prefix object 133 as one of the available interface definition objects for defining the hierarchy of the name space. A prefix object 133 defines a naming context within the interface repository 119. In a typical embodiment there may be many such prefix naming contexts, each defined by a separate prefix object 133. Each prefix object 133 is an IDL root context for the interface definition objects subordinate to it. Each prefix object 133 represents a user chosen prefix that can be used to segregate various naming contexts. For example, two prefix objects 133 may be created to store distinct prefixes such as "deployment" and "development," thereby segregating the deployment and development environments of the system 100. They may also be used to differentiate objects from different manufacturers, such as "SunSoft" or "DEC." Prefix naming contexts may also be used to differentiate different parts of computer systems, different company divisions, or other any type of differentiation useful to the users of the system 100. While references to the prefix object 133 and the prefix naming contexts in this document may refer to one or two such entities by way of example, it is to be understood that any number of prefix naming contexts and prefix objects 133 may be used in a single interface repository 119 according to the present invention.

Figure 3:
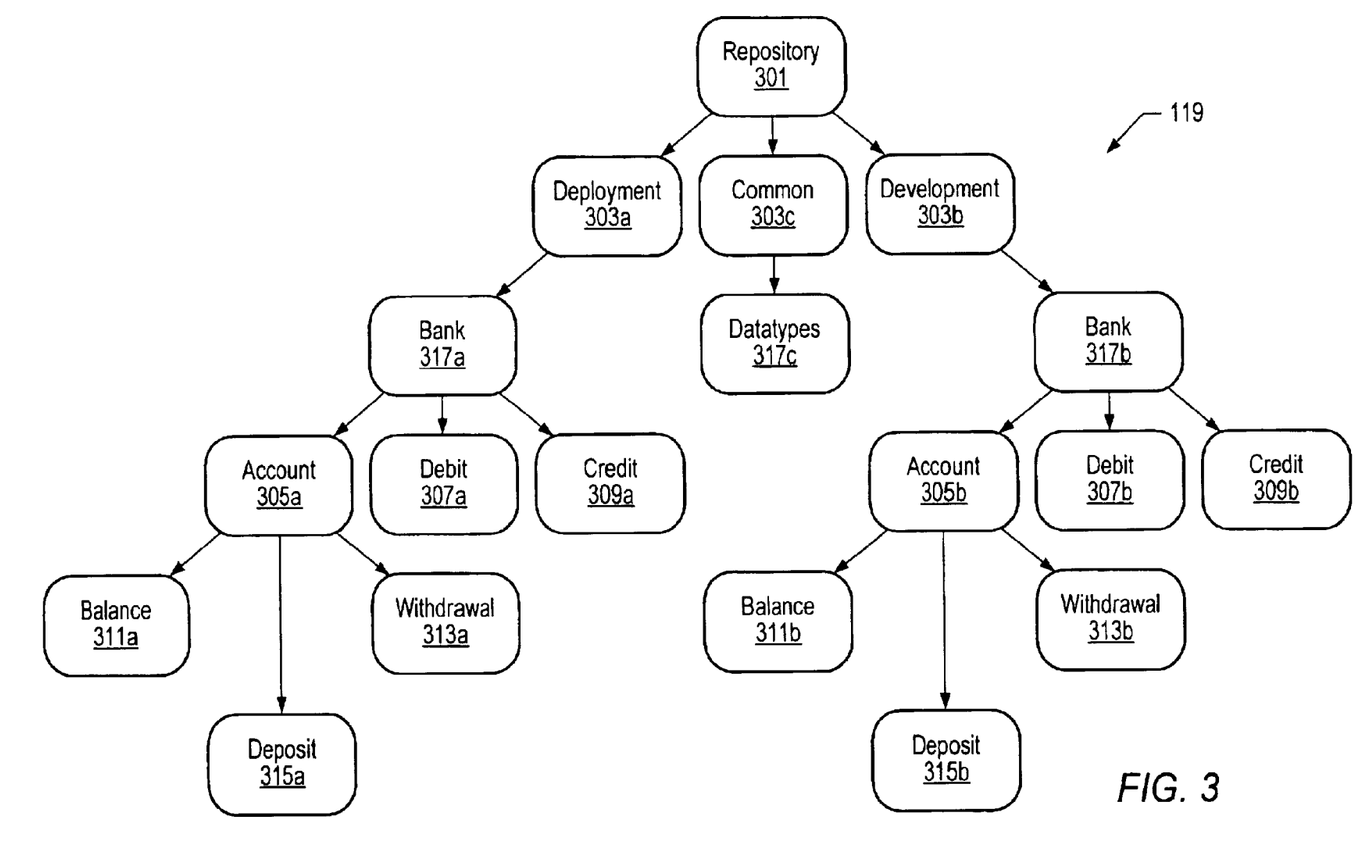
FIG. 3 is an illustration of an instance of one interface repository conforming to the present invention.

Second, each interface definition object in the interface repository 119 has an object name that includes a simple name of the object, such as "foo," and each of the naming contexts in which it is placed, and including the naming context defined by a superior prefix object 133. FIG. 3 illustrates one example of an interface repository 119 in accordance with the present invention, as might be used in a banking system. Here, there is the repository object 301, from which depend three prefix objects 133, a deployment object 303*a*, and a development object 303*b*, and a common object 303*c*. Under the deployment object 303*a*, there are additional interface definition objects, such as a bank module object 317*a*, an account object 305*a*, a debit object 307*a*, and a credit object 309*a*. Each of these objects 305*a*–309*a* are interface objects 123 because they define the interface of objects providing various services to clients. Accordingly, the account object 305*a* includes as part of its naming context, further subordinate interface definition objects, such as an account balance object 311*a*, a withdrawal object 313*a*, and a deposit object 315*a*. Each of these interface definition objects define various operations supported by the interface of the account object 305*a*. Similarly, under the development object 303*b*, there are similar objects 305*b*–315*b* which represent the interface definitions which are currently being updated by the bank's developers to improve the performance of the respective objects, for example, by adding new operations, or deleting unnecessary ones.

The object names of the objects 305–317 include the full naming context path, including their superior prefix objects 133. Thus, in the deployment prefix name context under the deployment object 303*a*, the account balance object 311*a* has an object name "deployment/bank/account/balance", whereas the other account balance object 311*b* that is in the development prefix naming context under the development object 303*b* has an object name of "development/bank/account/balance." Thus, the use of the prefix naming objects 133 allows for unambiguous differentiation of multiple interface definition objects for a given object type.

In the preferred embodiment, the interface repository 119 of the present invention processes the full prefix of the object name when it receives a request for an object, and is thus able to resolve potential name collisions between two interface definition objects of a given object type. In this manner, a single interface repository 119 is able to maintain multiple interface definition objects corresponding to a single object type. This allows clients of both interface definition objects to be present on the system 100 at one time. Thus, the interface of a given object can be modified and updated concurrently with, and in the same system as, the interface of its deployed version. This allows the development version to be tested with other existing client objects without duplication of system resources. It further eases the transition from a current version of an object interface to an improved one. With the prefix naming contexts, the improved interface repository 119 can support multiple client objects on both the current and updated interfaces. In addition, the transition or installation of an updated interface definition object does not require the system 100 to be shutdown.

System Operations

In conjunction with the improved system architecture described above, the present invention provides improved operations for both the IFR loader 143 and the IDL compiler 135. These operations create and modify the interface repository 119 using the prefix objects 133, and generate client stubs 137 and server skeletons 139 that incorporate the naming contexts provided by the prefix objects 133.

Load Interface Repository

Figure 4:
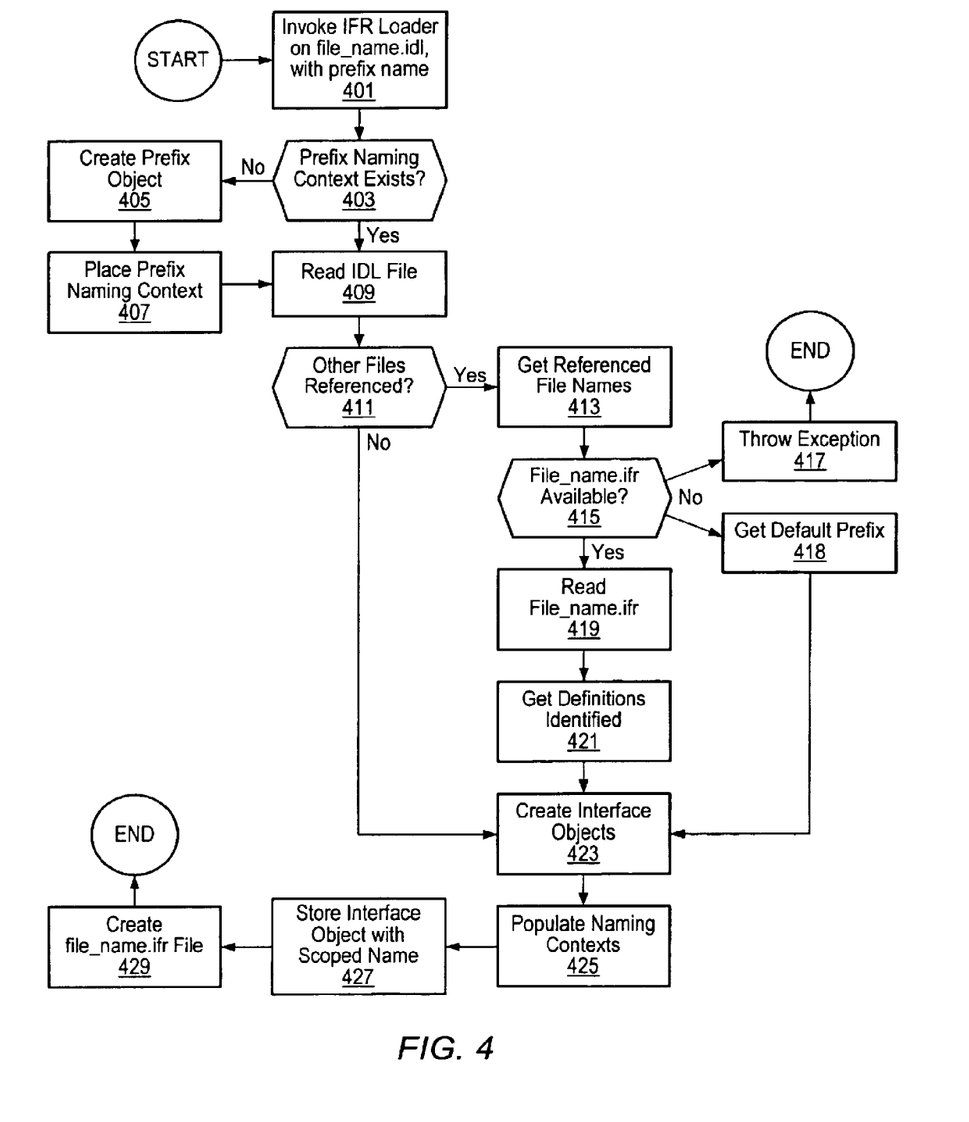
FIG. 4 is a flowchart of a method for providing multiple interface definitions in a single interface repository.

The interface repository 119 cooperates with a facility to create and maintain interface definition objects. This facility is the IFR loader 143. FIG. 4 is a flowchart illustrating the functional operation of the IFR loader 143 in loading the interface repository 119 according to the present invention.

The IFR loader 143 is invoked 401 to load a new IDL file, describing the interface of an object within system 100. The IFR loader 143 is passed arguments indicating the IDL file or files to be loaded, and the name of a prefix naming context in which interface definition objects resulting from the IDL file will be stored. For example, in one embodiment, a command line argument may be of the form ifrload new_object.idl -p deployment, where 'new_object.idl' is the file name of an IDL file to be loaded, and 'deployment' identifies a prefix object 133 defining a prefix naming context within which the interface definition is to be placed. This latter argument identifies where the IFR loader 143 is to subordinate the IDL root context.

The IFR loader 143 determines 403 if there exists a naming context defined by a prefix object 133 corresponding to the supplied prefix argument. If there is not already such a prefix object 133, the IFR loader 143 creates 405 a new prefix object 133 with the corresponding object name supplied in the prefix argument. This prefix object 133 is be placed 407 below the repository object 131, and becomes an IDL root context for the IDL definitions subordinated to it. For example, when the interface repository 119 shown in FIG. 3 is initially loaded from an empty state with the command ifrload bank.idl -p deployment, the deployment object 303a would be created as a prefix object 133 subordinate to the root repository object, and the IDL definitions in bank.idl would be placed in deployment prefix naming context. If there is a prefix object 133 with the specified prefix, then the IFR loader 143 continues.

The IFR loader 143 reads 409 the specified IDL file, and obtains the IDL declarations contained therein. In many instances, in a given IDL file there will reference symbols or tokens that are defined in other files. For example, interface definitions of object operations may have return types that are defined in other IDL files. Or an IDL file may refer to various library functions, or the like for use in defining operations. These other IDL files will be referenced by an include statement in the given IDL file, or a similar construct in other interface definition languages. However, the objects types in the included files will be defined by names that are not fully scoped with the prefix bound names, but rather, with only the IDL names as used in the interface declaration.

For example, an IDL file account.idl may have object operations that refer to return types defined in a datatypes.idl file with an #include "datatypes.idl" statement:

```
// File: account.idl
#include "datatypes.idl"
module bank{
    interface account {
    ...
        datatypes::money balance( ) {
        }
    ...
    }
};
//File: datatypes.idl
module datatypes {
    interface money( ) {
...}
}
```

Here, the return type of the balance operation is "money," which is defined in the included datatypes.idl file. Once installed in the interface repository 119, the interface definition objects for such operations must refer to interface definition objects of the return types that are defined in the interface repository 119. However, with the addition of the prefix objects 113, it is possible to have the interface "datatypes/money" defined in multiple prefix naming contexts. Any references to tokens that are defined in multiple naming contexts become ambiguous. Accordingly, the IFR loader 143 must be able to disambiguate the references to provide the definition of the tokens, such as the proper return type information. This is done in the preferred embodiment as follows.

The IFR loader 143 determines 411 whether the IDL file contains references to other IDL files through the use of "include" statements. When an include statement is located, the IFR loader 143 obtains 413 the included file names. The IFR loader 143 reads the directory for the included file to determine 415 if a file exists with the file name of the IDL file followed by the suffix "ifr." The ifr file is a new type of data file that contains the name of prefix object 133 under which the interface definitions for the included IDL files were placed if they were previously loaded. For example, with respect to FIG. 3, ifrload -p common datatypes.idl would load the datatypes.idl file into a prefix naming context defined by prefix object 303c called "common." This naming context includes information that is commonly available to both the development and deployment environments, such as the definition of data types. The IFR loader 143 will separately create a file named datatypes.ifr that contains the name of the prefix object, here common, under which the definitions in the data types file were placed. The ifr files, such as the datatypes.ifr, are stored in either the same directory as the included IDL file, or in a parallel file hierarchy. Those of ordinary skill in the art understand that the "ifr" suffix is merely used to differentiate the file from other types of files, and in itself is not significant. Other suitable file name schemes may be used to distinctly identify the file for the IFR loader 143.

If the ifr file for the included IDL file is available, the IFR loader 143 reads 419 the ifr file, and obtains 421 the naming context information stored therein. This allows the IFR loader 143 to resolve the reference, and obtain the correct information for object types, interface types, data types, exceptions, and the like. In this manner the existing interface definitions of common objects, or other existing objects, are available to any interface definition object in the interface repository 119, and thereby, a new interface definition object can be integrated in to the interface repository 119 without creating additional ambiguity. If the ifr file is not found, the IFR loader 143 may throw 417 an exception and exit, or may perform any other desirable action, such as selecting 418 a defined system-wide default prefix, and continue processing.

With the interface definitions from the IDL file and the included files, the IFR loader 143 creates 423 a naming context for each type declaration in the IDL file with the appropriate interface definition object. The naming contexts and interface definition objects are created according to the interface descriptions in the IDL files. For the example of the interface repository 119 of FIG. 3, the IFR loader 143 will create from an IDL file describing a banking system consisting of a bank module object, with subordinate account, debit, and credit interface objects 123, each of which may have subordinate operation, constant, exception and other interface definition objects.

As each interface definition object is created it is placed 425 in the appropriate naming context, subordinate to the naming context of the specified prefix object. Each interface definition object is given 427 an object name that is fully scoped, including the name of the prefix object 113 under which it is subordinated. This allows the interface repository 119 to subsequently avoid name collision for interfaces whose simple object names, or IDL scoped names, are the same, but which reside in different prefix naming contexts.

Finally, the IFR loader 143 creates 429 a data file with a name format of file_name.ifr where file_name is the name of the IDL file that was loaded, and "ifr" (or any other suitable suffix) indicates the type of data type described herein. The ifr file contains the name of the prefix object 133 under which the interface definition objects were created.

Generate New Stubs and Skeletons

The interface repository 119 is used to dynamically access object definitions. In addition, clients 105 may invoke server objects 117 using statically defined stub code routines 137 that provide access to the ORB 115. To ensure that the stubs 137 correctly identify the object interfaces, the IDL compiler 135 provides the clients 105 with the prefix name scope in such stub routines 137.

In addition, the server object 117 or its proxy object in a client stub 137 must as be able to respond to a request from another client object 105 to identify the interface of the server object 117. For example, in the CORBA environment, this is done with an _is_a( ) request. The _is_a( ) determines whether an object is of a given type:

CORBA::Boolean CORBA::Object::_is_a(object_type)

When there are two different interface definitions with the same IDL is name, but which reside in different prefix naming contexts, then there is encoded in the stubs 137 and skeletons 139 the correct prefix contexts for each interface definition. More particularly, for each interface definition object with a unique fully scoped name, there is provided stubs 137 and skeletons 139 encoding the correct prefix naming context. When the stubs 137 and skeletons 139 are generated, the IDL compiler 135 provides the stubs and skeletons with an object name including a prefix for identifying the interface of the object. For example, in FIG. 3, to generate stubs for the datatypes.idl file where the interface is defined in the common naming context, the command generate_stub -p common datatypes.idl would be used in the Solaris® environment. This command results in each of the stubs 137 for the object type definitions having the fully scoped names, including the prefix name for the "common" prefix naming context. This process is similarly done when the skeletons are generated.

When the stubs 137 and skeletons 139 include the fully scoped names, the client stub code 137 will supply the correct interface to the server object 117 because the stub code 137 is statically typed, and uniquely identifies the correct interface. This information allows the _is_a( ) and any operation that specifies type to provide the correct interface definition of an object.

In conclusion, in any place or operation where there is a need to specify the IDL type, such as with dynamic invocation through the interface repository 119, or through statically compiled code in the stubs and skeletons, then the use of a prefix naming context provides a way to differentiate the multiple IDL types.

We claim:

1. A computer system that resolves name collisions by providing type support for multiple type definitions, comprising:

an interface repository including:
 a repository naming context; and
 a prefix naming context subordinate to the repository naming context, the prefix naming context serving as a root naming context for at least one interface definition language declaration; and
an interface repository loader that accepts as input parameters a specified interface definition language file containing at least one interface definition language declaration, and a specified prefix name, and installs the at least one interface definition language declaration in a prefix naming context having the prefix naming context in the interface repository, wherein the interface repository loader creates a data file identified as related to the specified interface definition language file, and containing an identification of the specified prefix naming context.

2. A computer system that resolves name collisions by providing type support for multiple type definitions, comprising:

an interface repository including:
 a repository naming context; and
 a prefix naming context subordinate to the repository naming context, the prefix naming context serving as a root naming context for at least one interface definition language declaration; and
an interface repository loader that accepts as input parameters a specified interface definition language file containing at least one interface definition language declaration, and a specified prefix name, and installs the at least one interface definition language declaration in a prefix naming context having the prefix naming context in the interface repository, wherein the interface repository loader creates the specified prefix naming context in the interface repository if the specified prefix naming context does not exist therein.

3. A computer system that resolves name collisions by providing type support for multiple type definitions, comprising:

an interface repository including:
 a repository naming context; and
 a prefix naming context subordinate to the repository naming context, the prefix naming context serving as a root naming context for at least one interface definition language declaration;

a memory device that stores the interface repository; and a processing unit that executes operations of an interface repository loader, wherein the processing unit further executes the interface repository loader to create a data file identified as related to a specified interface definition language file, and containing an identification of a specified prefix naming context.

4. A method of providing type support for multiple type definitions, comprising the steps of:

defining in an interface repository a prefix naming context;

storing the prefix naming context subordinate to a repository naming context in the interface repository, the prefix naming context forming an interface definition language root context for interface definition objects subordinate to the prefix naming context;

specifying an interface definition language file containing at least one interface definition language declaration;

specifying a prefix naming context;

storing each interface definition language declaration in the specified interface definition language file into the specified prefix naming context; and creating a data file identified as related to the specified interface definition language file, and containing an identification of the specified prefix naming context.

5. A computer system that resolves name collisions by providing type support for multiple type definitions, comprising:

an interface repository including:
 a repository naming context; and
 a prefix naming context subordinate to the repository naming context, the prefix naming context serving as a root naming context for at least one interface definition language declaration, the prefix naming context being adapted to resolve names subordinate to the repository naming context; and an interface repository loader that accepts as input parameters a specified interface definition language file containing at least one interface definition language declaration, and a specified prefix name, and installs the at least one interface definition language declaration in a prefix naming context having the prefix naming context in the interface repository.

6. The system of claim 5 wherein the prefix naming context further includes:

at least one naming context defined by an interface definition object and subordinate to the prefix naming context.

7. A computer system that resolves name collisions by providing type support for multiple type definitions, comprising:

an interface repository including:
 a repository naming context; and
 a prefix naming context subordinate to the repository naming context, the prefix naming context serving as a root naming context for at least one interface definition language declaration, the prefix naming context being adapted to resolve names subordinate to the repository naming context, wherein the prefix naming context further includes at least one naming context defined by an interface definition object and subordinate to the prefix naming context; and an interface repository loader that accepts as input parameters a specified interface definition language file containing at least one interface definition language declaration, and a specified prefix name, and installs the at least one interface definition language declaration in a prefix naming context having the prefix naming context in the interface repository;

wherein at least one interface definition object has a fully scoped object name including a prefix name of the prefix naming context to which the interface definition object is subordinated.

8. The computer system of claim 5 wherein the prefix naming context is immediately subordinate to the repository naming context.

9. The computer system of claim 5 wherein the prefix naming context further includes:

at least one leaf node defined by an interface definition object.

10. The computer system of claim 5, wherein the prefix naming context is defined by a prefix object.

11. A computer system that resolves name collisions by providing type support for multiple type definitions, comprising:

an interface repository including:
 a repository naming context; and
 a prefix naming context subordinate to the repository naming context, the prefix naming context serving as a root naming context for at least one interface definition language declaration, the prefix naming context being adapted to resolve names subordinate to the repository naming context; and an interface repository loader that accepts as input parameters a specified interface definition language file containing at least one interface definition language declaration, and a specified prefix name, and installs the at least one interface definition language declaration in a prefix naming context having the prefix naming context in the interface repository, and wherein the interface repository loader creates a data file identified as related to the specified interface definition language file, and containing an identification of the specified prefix naming context.

12. A computer system that resolves name collisions by providing type support for multiple type definitions, comprising:

an interface repository including:
 a repository naming context; and
 a prefix naming context subordinate to the repository naming context, the prefix naming context serving as a root naming context for at least one interface, definition language declaration, the prefix naming context being adapted to resolve names subordinate to the repository naming context; and an interface repository loader that accepts as input parameters a specified interface definition language file containing at least one interface definition language declaration, and a specified prefix name, and installs the at least one interface definition language declaration in a prefix naming context having the prefix naming context in the interface repository, and wherein the interface repository loader creates the specified prefix naming context in the interface repository if the specified prefix naming context does not exist therein.

13. The computer system of claim 12, further comprising:
a memory device that stores the interface repository; and
a processing unit that executes operations of the interface repository loader.

14. A computer system that resolves name collisions by providing type support for multiple type definitions, comprising:

an interface repository including:
  a repository naming context; and
  a prefix naming context subordinate to the repository naming context, the prefix naming context serving as a root naming context for at least one interface definition language declaration, the prefix naming context being adapted to resolve names subordinate to the repository naming context;
an interface repository loader that accepts as input parameters a specified interface definition language file containing at least one interface definition language declaration, and a specified prefix name, and installs the at least one interface definition language declaration in a prefix naming context having the prefix naming context in the interface repository;
a memory device that stores the interface repository; and
a processing unit that executes operations of the interface repository loader, and further executes the interface repository loader to create a data file identified as related to the specified interface definition language file, and containing an identification of the specified prefix naming context.

15. A method of resolving name collisions by providing type support for multiple type definitions, comprising the steps of:
  defining in an interface repository a prefix naming context, the prefix naming context being adapted to resolve names subordinate to the repository naming context;
  storing the prefix naming context subordinate to the repository naming context in the interface repository, the prefix naming context forming an interface definition language root context for interface definition objects subordinate to the prefix naming context;
  specifying an interface definition language file containing at least one interface definition language declaration;
  specifying the prefix naming context; and
  storing each interface definition language declaration in the specified interface definition language file into the specified prefix naming context.

16. The method of claim 15, wherein each prefix naming context is stored immediately subordinate to the repository naming context.

17. A method of resolving name collisions by providing type support for multiple type definitions, comprising the steps of:
  defining in an interface repository a prefix naming context, the prefix naming context being adapted to resolve names subordinate to the repository naming context;
  storing the prefix naming context subordinate to the repository naming context in the interface repository, the prefix naming context forming an interface definition language root context for interface definition objects subordinate to the prefix naming context;
  specifying an interface definition language file containing at least one interface definition language declaration;
  specifying the prefix naming context; and
  storing each interface definition language declaration in the specified interface definition language file into the specified prefix naming context, wherein the step of storing each interface definition language declaration further comprises the steps of:
    creating an interface definition object for the interface definition language declaration;
    storing the interface definition object in the specified prefix naming context; and
    providing the interface definition object with a fully scoped object name including a prefix name from the prefix naming context in which the interface definition object is stored.

18. A method of resolving name collisions by providing type support for multiple type definitions, comprising the steps of:
  defining in an interface repository a prefix naming context, the prefix naming context being adapted to resolve names subordinate to a repository naming context;
  storing the prefix naming context subordinate to the repository naming context in the interface repository, the prefix naming context forming an interface definition language root context for interface definition objects subordinate to the prefix naming context;
  specifying an interface definition language file containing at least one interface definition language declaration;
  specifying a prefix naming context;
  storing each interface definition language declaration in the specified interface definition language file into the specified prefix naming context; and
  creating a data file identified as related to the specified interface definition language file, and containing an identification of the specified prefix naming context.

19. A computer system that resolves names, comprising:
  an interface definition language file containing a first set of one or more interface definitions, wherein the one or more interface definitions include an IDL root context;
  an interface repository naming context;
  an interface repository loader operable to install the one or more interface definitions in the interface repository naming context under a specified prefix naming context, wherein the specified prefix naming context acts as the root IDL naming context.

20. The computer system of claim 19, further comprising:
  a second interface definition language file containing a second set of one or more interface definitions, wherein the interface definition includes the IDL root context,
  wherein the interface repository loader is further operable to install the second set of one or more interface definitions in the interface repository naming context under a second specified prefix naming context, wherein the second prefix naming context acts as the root IDL naming context.

21. The system of claim 19 wherein the specified prefix naming context further includes at least one naming context defined by an interface definition object and subordinate to the specified prefix naming context.

22. A computer system that resolves names, comprising:
  an interface definition language file containing a first set of one or more interface definitions, wherein the one or more interface definitions include an IDL root context;
  an interface repository naming context;
  an interface repository loader operable to install the one or more interface definitions in the interface repository naming context under a specified prefix naming context, wherein the specified prefix naming context acts as the root IDL naming context;
  wherein the specified prefix naming context further includes at least one naming context defined by an interface definition object and subordinate to the specified prefix naming context;

wherein at least one interface definition object has a fully scoped object name including a prefix name of the prefix naming context to which the interface definition object is subordinated.

23. The computer system of claim 19 wherein the specified prefix naming context is immediately subordinate to the repository naming context.

24. The computer system of claim 19 wherein the specified prefix naming context further includes at least one leaf node defined by an interface definition object.

25. The computer system of claim 19, wherein the specified prefix naming context is defined by a prefix object.

26. A computer system that resolves names, comprising;

an interface definition language file containing a first set of one or more interface definitions, wherein the one or more interface definitions include an IDL root context;

an interface repository naming context;

an interface repository loader operable to install the one or more interface definitions in the interface repository naming context under a specified prefix naming context, wherein the specified prefix naming context acts as the root IDL naming context;

wherein the interface repository loader creates a data file identified as related to the interface definition language file, and containing an identification of the specified prefix naming context.

27. A computer system that resolves names, comprising;

an interface definition language file containing a first set of one or more interface definitions, wherein the one or more interface definitions include an IDL root context;

an interface repository naming context;

an interface repository loader operable to install the one or more interface definitions in the interface repository naming context under a specified prefix naming context, wherein the specified prefix naming context acts as the root IDL naming context;

wherein the interface repository loader creates the specified prefix naming context in the interface repository if the specified prefix naming context does not exist therein.

* * * * *